United States Patent
Höglund et al.

(10) Patent No.: US 9,743,352 B2
(45) Date of Patent: Aug. 22, 2017

(54) NETWORK NODE AND MOBILE DEVICE FOR USE IN A COMMUNICATION NETWORK, METHODS OF OPERATING THE SAME AND COMPUTER PROGRAM PRODUCTS

(71) Applicant: Telefonaktiebolaget L M Ericsson (publ), Stockholm (SE)

(72) Inventors: Andreas Höglund, Solna (SE); Gunnar Mildh, Sollentuna (SE); Tuomas Tirronen, Helsinki (FI); Emre Yavuz, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 67 days.

(21) Appl. No.: 14/909,778

(22) PCT Filed: Jul. 4, 2014

(86) PCT No.: PCT/SE2014/050857
§ 371 (c)(1),
(2) Date: Feb. 3, 2016

(87) PCT Pub. No.: WO2015/020590
PCT Pub. Date: Feb. 12, 2015

(65) Prior Publication Data
US 2016/0192292 A1    Jun. 30, 2016

Related U.S. Application Data

(60) Provisional application No. 61/863,989, filed on Aug. 9, 2013.

(51) Int. Cl.
G08C 17/00    (2006.01)
G06F 15/177    (2006.01)
(Continued)

(52) U.S. Cl.
CPC ....... *H04W 52/0216* (2013.01); *H04W 68/00* (2013.01); *H04W 68/02* (2013.01); *H04W 76/048* (2013.01); *Y02B 60/50* (2013.01)

(58) Field of Classification Search
CPC .................................. H04W 52/0216
See application file for complete search history.

(56) References Cited

U.S. PATENT DOCUMENTS 8,200,253 B2    6/2012  Du
2009/0318177 A1  12/2009  Wang et al.
(Continued)

FOREIGN PATENT DOCUMENTS

EP    2574111 A1    3/2013

OTHER PUBLICATIONS

Author Unknown, "Technical Specification Group Radio Access Network; Radio Resource Control (RRC); Protocol specification (Release 11)," Technical Specification 25.331, Version 11.5.0, 3GPP Organizational Partners, Mar. 2013, 2,079 pages.
(Continued)

*Primary Examiner* — Gerald Smarth
(74) *Attorney, Agent, or Firm* — Withrow & Terranova, PLLC

(57) ABSTRACT

According to one aspect, there is provided a method of operating a network node in a communication network with the communication network comprising at least one mobile device that is operating in a discontinuous reception, DRX, mode with a DRX cycle length that is longer than a modification period in the network. In the method, when an update to system information is to occur in an updated information modification period, the modification period immediately preceding the updated information modification period comprising a change notification modification period, a paging message is transmitted to the mobile device
(Continued)

during a modification period other than the change notification modification period and the updated information modification period, the paging message informing the mobile device that an update to system information is to occur in the updated information modification period.

18 Claims, 6 Drawing Sheets

(51) Int. Cl.
*H04W 52/02* (2009.01)
*H04W 68/00* (2009.01)
*H04W 68/02* (2009.01)
*H04W 76/04* (2009.01)

(56) References Cited

U.S. PATENT DOCUMENTS

| | | | |
|---|---|---|---|
| 2011/0261739 A1 | 10/2011 | Fong et al. | |
| 2013/0088983 A1* | 4/2013 | Pragada | H04W 16/14 370/252 |
| 2013/0176890 A1* | 7/2013 | Sharma | H04B 7/15557 370/252 |
| 2013/0208587 A1* | 8/2013 | Bala | H04W 16/14 370/230 |
| 2013/0260740 A1* | 10/2013 | Rayavarapu | H04W 76/046 455/422.1 |
| 2013/0324168 A1* | 12/2013 | Ishii | H04W 48/08 455/458 |
| 2015/0071139 A1* | 3/2015 | Nix | H04W 52/0235 370/311 |

OTHER PUBLICATIONS

Author Unknown, "Technical Specification Group Radio Access Network; Evolved Universal Terrestrial Radio Access (E-UTRA); Physical Channels and Modulation (Release 11)," Technical Specification 36.211, Version 11.1.0, 3GPP Organizational Partners, Dec. 2012, 108 pages.

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.3.0, 3GPP Organizational Partners, Mar. 2013, 344 pages.

International Search Report and Written Opinion for International Patent Application No. PCT/SE2014/050857, mailed Oct. 27, 2014, 8 pages.

International Preliminary Report on Patentability for International Patent Application No. PCT/SE2014/050857, mailed Oct. 7, 2015, 4 pages.

* cited by examiner

NETWORK NODE AND MOBILE DEVICE FOR USE IN A COMMUNICATION NETWORK, METHODS OF OPERATING THE SAME AND COMPUTER PROGRAM PRODUCTS

This application is a 35 U.S.C. §371 national phase filing of International Application No. PCT/SE2014/050857, filed Jul. 4, 2014, which claims the benefit of U.S. Provisional Application No. 61/863,989, filed Aug. 9, 2013, the disclosures of which are incorporated herein by reference in their entireties.

TECHNICAL FIELD

The technology described relates to communication networks, and in particular to the signalling of updates to system information for mobile devices operating with an extended discontinuous reception (DRX) period.

BACKGROUND

In a typical cellular radio system, radio or wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network) or "eNodeB" (in a Long Term Evolution (LTE) network). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using a wideband code division multiple access (WCDMA) air interface between user equipment units (UEs) and radio access network (RAN).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. The first release for the Evolved Universal Terrestrial Radio Access Network (E-UTRAN) specification has issued, and as with most specifications, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes termed a "flat" architecture including radio base station nodes without reporting to radio network controller (RNC) nodes.

A currently popular vision of the future of cellular networks includes machines or other autonomous devices communicating between each other (or with an application server) without human interaction. A typical scenario is to have sensors sending measurements infrequently, where each of the transmissions would consist of only small amounts of data. This type of communication is called machine to machine (M2M) communication in the literature, or machine-type communication (MTC), in 3GPP.

UEs in cellular systems (such as 3GPP WCDMA, LTE) are most commonly battery driven and the power consumption of these devices is therefore an important factor.

In the context of MTC, many of the devices are expected to be battery operated as well. Sensors and other devices may reside in remote locations and the number of deployed devices could be so large that it would be practically infeasible to replace or frequently recharge the batteries in these kinds of devices. Thus, it is an important goal to aim for reduction in the power consumption when considering improvements for current cellular systems.

An existing means to reduce the battery power consumption is to use discontinuous reception (DRX), a feature in which the UE's receiver is switched off except during configured periods at configured intervals.

Currently the longest specified DRX cycle lengths are 2.56 seconds and 5.12 seconds for EUTRA and UTRA, respectively. However, it would beneficial to extend the DRX cycle lengths beyond currently specified values to further reduce the battery power consumption, especially for the benefit of MTC devices where there is no possibility for interactive charging or changing of the battery on a regular basis. Although longer DRX cycle lengths naturally cause larger delays in the downlink, this is typically not a problem for delay insensitive traffic such as that generated by MTC devices. However, there are procedures such as those used by mobile devices to maintain up to date system information that may need to be aligned accordingly in case the DRX cycles are extended beyond the current limits.

In particular, it is important for a mobile device operating with DRX to maintain up-to-date system information because otherwise it cannot interact with the network in an interoperable manner. In particular, if the mobile device does not have recent system information, it must acquire the latest version of the system information prior to access, which means that it cannot access the system (e.g. transmit random access requests, etc.) before it has obtained the latest version of the system information. On the other hand, frequent acquisition of system information has an adverse impact on the battery life time. In E-UTRA networks, the information required to enable reliable communications with the network is referred to as System Information (SI) and is transmitted to the UE in a number of different System Information Blocks (SIBs) and a Master Information Block (MIB). One such element of System Information in E-UTRAN is the System Frame Number (SFN), which the UE uses to keep synchronisation with the network and which acts as a timing reference.

The SFN is defined in a Master Information Block (MIB) in a "systemFrameNumber" field which defines the 8 most significant bits of the system frame number (SFN). 3GPP TS 36.211 "E-UTRA; Physical Channels and Modulation" v11.1.0 (2012-12) [section 21, 6.6.1] indicates that the 2 least significant bits of the SFN are acquired implicitly in the physical broadcast channel (P-BCH) decoding, i.e. timing of 40 ms P-BCH transmission time interval (TTI) indicates the 2 least significant bits (within 40 ms P-BCH TTI, the first radio frame: 00, the second radio frame: 01, the third radio frame: 10, the last radio frame: 11). One value applies for all serving cells (the associated functionality is common i.e. not performed independently for each cell).

Procedures exist for notifying mobile devices operating with DRX that system information (SI) has changed. In particular, in E-UTRAN, when System Information is updated in a cell, the UEs in the cell are informed about this by a flag (called the systemInfoModification-flag) being set in the paging message sent to each UE. If the flag is set, the UEs then activate the receivers to receive and read the relevant broadcast (e.g. SIB1) accordingly. This paging is sent out to UEs during a SI modification period, which is equal to the SFN period (i.e. the period required for the SFN to cycle through the full range of SFN values) or a fraction of it, thus ensuring that all UEs have been notified of the SI change. During the following modification period, UEs read the relevant SIB and apply the new SI. According to the 3GPP Technical Specification 36.331 v11.3.0 (section 5.2.1.3), the boundaries of the modification period are defined as the SFN for which SFN mod m=0, where m is the length of the modification period in number of radio frames. Therefore, modification periods longer than the maximal SFN of 1024 are not possible.

SUMMARY

Using current SI update procedures, for UEs with DRX cycles longer than the SFN period/SI modification period (which are referred to below as 'extended DRX UEs'), it cannot be assured that these UEs can be made aware of an SI change. That is, it is possible for an extended DRX UE to be in sleep mode with its receiver turned off during an entire modification period, which means that it is unable to receive paging information about changed SI and to adjust its operation in accordance with the change system information before the UE's next active period (e.g. data transmission and/or reception).

One unsatisfactory solution to this problem is to force extended-DRX UEs to read the current system information (for example one or more SIBs, e.g. SIB1) prior to data transmission. However, since changes to SI are relatively rare, this will in general result in the UE reading the SIB when no update has occurred, and this causes an increase in power consumption from unnecessarily reading SI, which may negate the gains in battery life provided by using extended DRX cycles (i.e. DRX cycles beyond the currently specified limits).

Thus, in some embodiments, mobile devices operating in an extended DRX cycle (i.e. with a DRX cycle longer that the SFN period or SI modification period) can be informed about the change to the system information prior to the 'normal' modification period (i.e. the modification period in which UEs operating in non-DRX modes or conventional DRX modes are informed of the change). This early notification of the system information change for extended DRX UEs allows DRX cycles to be used that are longer than the modification period.

In particular embodiments, the extended DRX UEs are informed about the change to the system information prior to the normal modification period through an additional or dedicated paging message (i.e. dedicated to extended DRX UEs) that includes a flag for indicating whether system information is about to change. This flag can be labelled 'systemInfoModification-flag' as in the conventional paging messages.

In accordance with an aspect, there is provided a method of operating a network node in a communication network, the communication network comprising at least one mobile device that is operating in a discontinuous reception, DRX, mode with a DRX cycle length that is longer than a modification period in the network. When an update to system information is to occur in an updated information modification period, the modification period immediately preceding the updated information modification period comprising a change notification modification period, the method comprises transmitting a paging message to the mobile device during a modification period other than the change notification modification period and the updated information modification period, the paging message informing the mobile device that an update to system information is to occur in the updated information modification period.

In some embodiments, the method described above comprises transmitting the paging message informing the mobile device about the update to system information to the mobile device during a modification period that occurs before the change notification modification period.

In other embodiments, for example where a mobile device does not need to apply the updated system information in order to continue to receive paging messages, the method described above comprises transmitting the paging message informing the mobile device about the update to system information to the mobile device during a modification period that occurs after the updated information modification period.

In accordance with another aspect, there is provided a network node for use in a communication network, the communication network comprising at least one mobile device that is operating in a discontinuous reception, DRX, mode with a DRX cycle length that is longer than a modification period in the network. The network node comprises a transceiver module and a processing module configured to control the transceiver module to transmit paging messages to the mobile device, and the processing module is configured such that, when an update to system information is to occur in an updated information modification period, the modification period immediately preceding the updated information modification period comprising a change notification modification period, the processing module controls the transceiver module to transmit a paging message during a modification period other than the change notification modification period and the updated information modification period, the paging message informing the mobile device that an update to system information is to occur in the updated information modification period.

According to another aspect there is provided a network node for use in a communication network that comprises at least one mobile device that is operating in a discontinuous reception, DRX, mode with a DRX cycle length that is longer than a modification period in the network. The network node is adapted to transmit a paging message to the mobile device during a modification period other than a change notification modification period and an updated information modification period when an update to system information is to occur in the updated information modification period, the change notification modification period being the modification period immediately preceding the updated information modification period, the paging message informing the mobile device that an update to system information is to occur in the updated information modification period.

According to another aspect there is provided a network node for use in a communication network that comprises at least one mobile device that is operating in a discontinuous reception, DRX, mode with a DRX cycle length that is longer than a modification period in the network. The network node comprises a processor and a memory, the memory containing instructions executable by said processor whereby the network node is operative to transmit a paging message to the mobile device during a modification period other than a change notification modification period and an updated information modification period when an update to system information is to occur in the updated information modification period, the change notification modification period being the modification period immediately preceding the updated information modification period, the paging message informing the mobile device that an update to system information is to occur in the updated information modification period.

According to another aspect, there is provided a method of operating a mobile device in a communication network, the communication network comprising a network node. The method comprises operating the mobile device in a discontinuous reception, DRX, mode with a DRX cycle length that is longer than a modification period in the network; periodically activating a receiver in the mobile device to receive a paging message from the network node; processing a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

In some embodiments, the paging message indicating an update to system information is received during a modification period that occurs before the change notification modification period.

In other embodiments, for example where a mobile device does not need to apply the updated system information in order to continue to receive paging messages, the paging message indicating an update to system information is received during a modification period that occurs after the updated information modification period.

In some embodiments, the method of operating a mobile device further comprises activating the receiver in the mobile device during the updated information modification period to determine the updated system information if an update to system information is to occur.

In alternative embodiments, the method of operating a mobile device further comprises following receipt of a paging message indicating that an update to system information is to occur, activating the receiver in the mobile device to determine the updated system information when the mobile device is to transmit data to the network node.

According to yet another aspect, there is provided a mobile device for use in a communication network, the communication network comprising a network node, the mobile device comprising a receiver or transceiver module; and a processing module configured to control the receiver or transceiver module to operate in a discontinuous reception, DRX, mode with a DRX cycle length that is longer than a modification period in the network. The processing module is further configured to periodically activate the receiver or transceiver module to receive a paging message from the network node and to process a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

According to another aspect, there is provided a mobile device for use in a communication network that comprises a network node, the mobile device comprising a receiver, and the mobile device being adapted to operate in a discontinuous reception, DRX, mode with a DRX cycle length that is longer than a modification period in the network; periodically activate the receiver to receive a paging message from the network node; and process a received paging message to determine if an update to system information is to occur in an updated information modification period. The updated information modification period is preceded by a change notification modification period, and a paging message indicating an update to system information is to occur is received during a modification period other than the change notification modification period and the updated information modification period.

According to another aspect there is provided a mobile device for use in a communication network that comprises a network node, the mobile device comprising a receiver, a processor and a memory, the memory containing instructions executable by the processor whereby said mobile device is operative to operate in a discontinuous reception, DRX, mode with a DRX cycle length that is longer than a modification period in the network; periodically activate the receiver to receive a paging message from the network node; and process a received paging message to determine if an update to system information is to occur in an updated information modification period. The updated information modification period is preceded by a change notification modification period, wherein a paging message indicating an update to system information is to occur is received during a modification period other than the change notification modification period and the updated information modification period.

According to another aspect, there is provided a computer program product having computer readable code embodied therein, the computer readable code being configured such that, on execution by a suitable computer or processor, the computer or processor is caused to perform any of the method embodiments described above.

DETAILED DESCRIPTION

Figure 1:
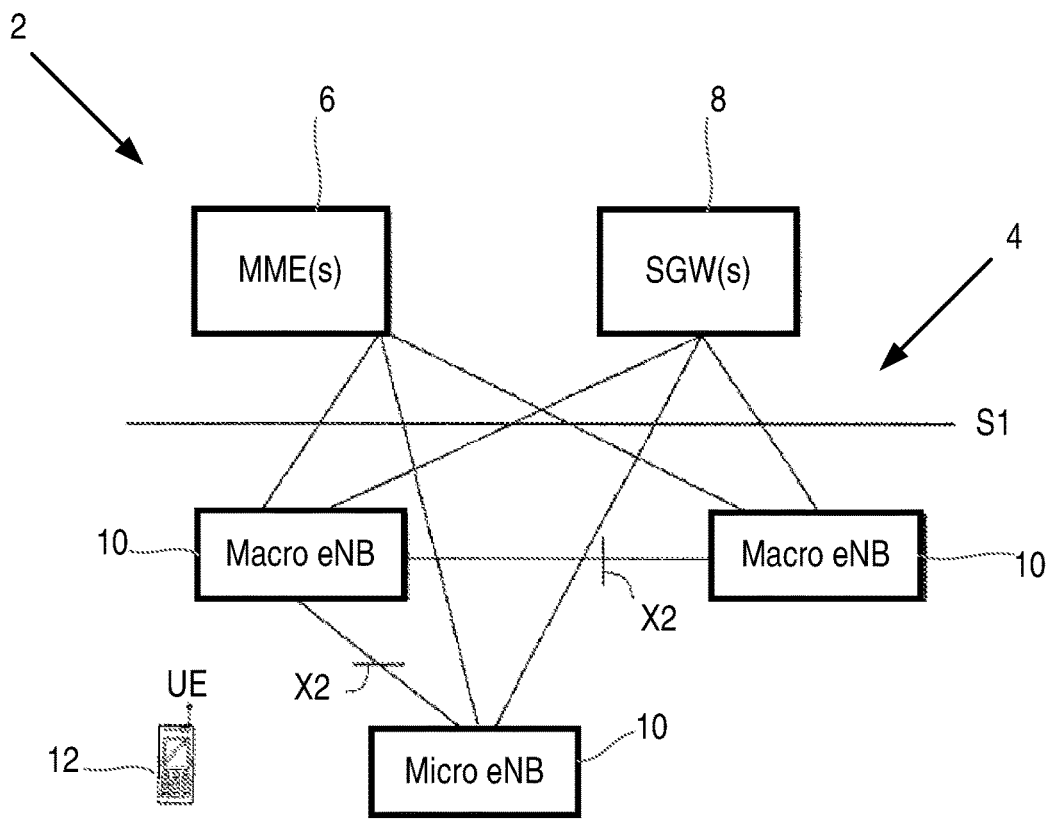
FIG. 1 is a non-limiting example block diagram of an LTE cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the term "mobile device" is used interchangeably in the following description, and it will be appreciated that such a device, particularly a MTC device, does not necessarily have to be 'mobile' in the sense that it is carried by a user. Instead, the term "mobile device" encompasses any device that is capable of communicating with communication networks that operate according to one or more mobile communication standards, such as GSM, UMTS, LTE, etc.

A cell is associated with a base station, where a base station comprises in a general sense any node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

It should be noted that use of the term "network node" as used herein can refer to a base station, such as an eNodeB, a network node in the RAN responsible for resource management, such as a radio network controller (RNC), or a core network node, such as a mobility management entity (MME).

The signalling described is either via direct links or logical links (e.g. via higher layer protocols and/or via one or more network nodes). For example, signalling from a coordinating node may pass another network node, e.g., a radio node.

FIG. 1 shows an example diagram of an E-UTRAN architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 referred to in LTE as eNBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12.

Figure 2:
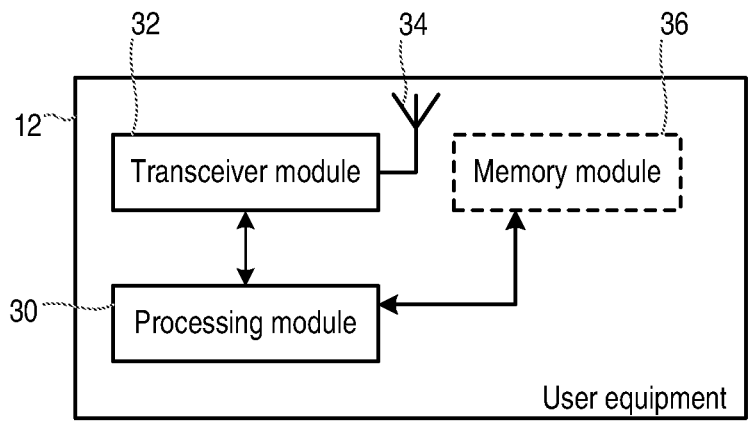
FIG. 2 is a block diagram of a mobile device according to an embodiment.

FIG. 2 shows a user equipment (UE) 12 that can be used in one or more of the non-limiting example embodiments described. The UE 12 may in some embodiments be a mobile device that is configured for machine-to-machine (M2M) or machine-type communication (MTC). The UE 12 comprises a processing module 30 that controls the operation of the UE 12. The processing module 30 is connected to a receiver or transceiver module 32 (which comprises a receiver and a transmitter) with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. The user equipment 12 also comprises a memory module 36 that is connected to the processing module 30 and that stores program and other information and data required for the operation of the UE 12.

Figure 3:
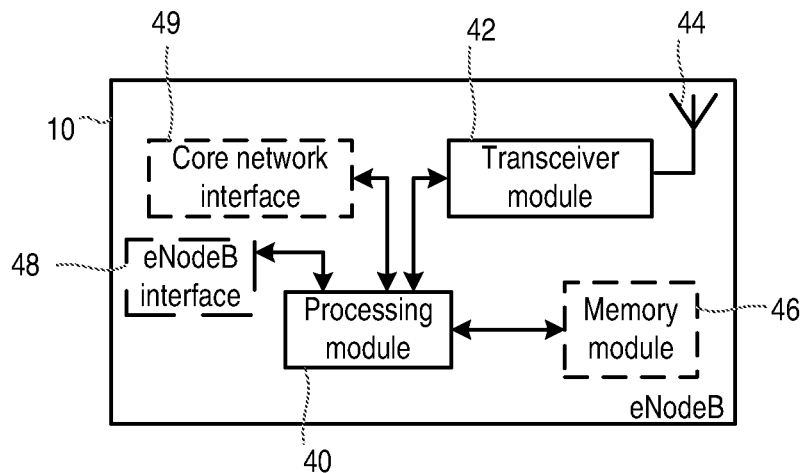
FIG. 3 is a block diagram of a base station according to an embodiment.

FIG. 3 shows a base station 10 (for example a NodeB or an eNodeB) that can be used in example embodiments described. It will be appreciated that although a macro eNB will not in practice be identical in size and structure to a micro eNB, for the purposes of illustration, the base stations 10 are assumed to include similar components. Thus, the base station 10 comprises a processing module 40 that controls the operation of the base station 10. The processing module 40 is connected to a transceiver module 42 (which comprises a receiver and a transmitter) with associated antenna(s) 44 which are used to transmit signals to, and receive signals from, user equipments 12 in the network 2. The base station 10 also comprises a memory module 46 that is connected to the processing module 40 and that stores program and other information and data required for the operation of the base station 10. The base station 10 also includes components and/or circuitry 48 for allowing the base station 10 to exchange information with other base stations 10 (for example via an X2 interface) and components and/or circuitry 49 for allowing the base station 10 to exchange information with nodes in the core network 4 (for example via the S1 interface). It will be appreciated that base stations for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

Figure 4:
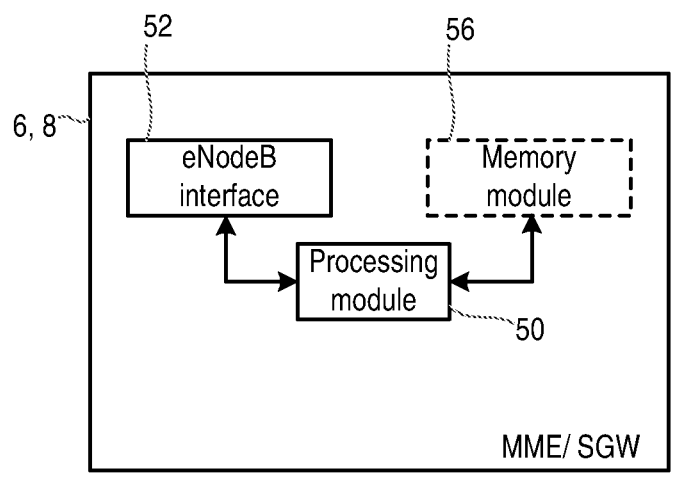
FIG. 4 is a block diagram of a core network node according to an embodiment.

FIG. 4 shows a core network node 6, 8 that can be used in the example embodiments described. The node 6, 8 comprises a processing module 50 that controls the operation of the node 6, 8. The processing module 50 is connected to components and/or circuitry 52 for allowing the node 6, 8 to exchange information with the base stations 10 with which it is associated (which is typically via the S1 interface). The node 6, 8 also comprises a memory module 56 that is connected to the processing module 50 and that stores program and other information and data required for the operation of the node 6, 8.

It will be appreciated that only the components of the UE 12, base station 10 and core network node 6, 8 required to explain the embodiments presented herein are illustrated in FIGS. 2, 3 and 4.

As noted above, in conventional operation when system information (SI) changes, the network first notifies all UEs of the SI change by means of setting a systemInfoModification-flag in the paging message during one modification period. The following explanation of the conventional operation is based on section 5.2.1.3 of 3GPP TS 36.331 v11.3.0 (2013-03) that explains how system information validity and notification of changes is communicated to UEs.

Change of system information generally only occurs at specific radio frames, i.e. the concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

Figure 5:
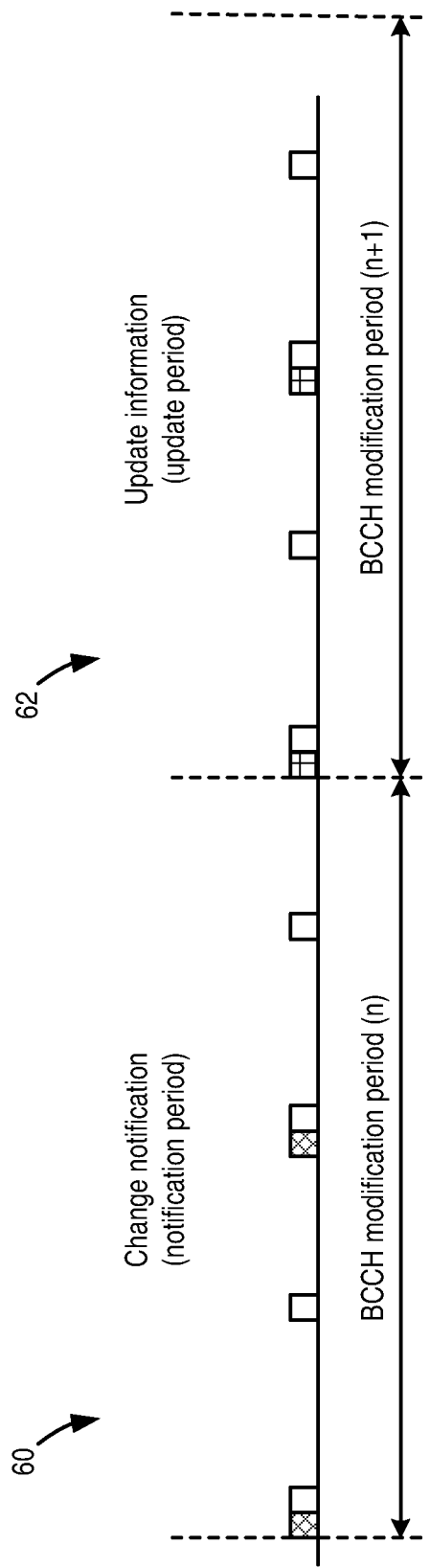
FIG. 5 illustrates a conventional procedure for signalling a change of system information.

When the network changes (some of the) system information, it first notifies the UEs about this change, i.e. this may be done throughout a modification period. In the next modification period, the network transmits the updated system information. These general principles are illustrated in FIG. 5, in which different patterned blocks indicate different system information. Upon receiving a change notification in a 'change notification' modification period 60 (which, in the context of the two modification periods in which the change notification and information updates occur, is also referred to herein as the 'notification period' 60), the UE acquires the new system information immediately from the start of the next modification period, referred to as the 'updated information' modification period 62 (which is also referred to herein as the 'update period' 62). The UE applies the previously acquired system information until the UE acquires the new system information.

A Paging message is used to inform UEs in RRC_IDLE and in RRC_CONNECTED about a system information change. If the UE receives a Paging message including the systemInfoModification flag set, it knows that the system information will change at the next modification period boundary. Although the UE may be informed about changes in system information, no further details are provided e.g. regarding which system information will change.

SystemInformationBlockType1 (also referred to herein as SIB type 1 or SIB1) includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise.

E-UTRAN may not update systemInfoValueTag upon change of some system information e.g. regularly changing parameters like time information (which is found in SystemInformationBlockType8, SystemInformationBlockType16). Similarly, E-UTRAN may not include the systemInfoModification flag within the Paging message upon change of some types of system information.

The UE verifies that stored system information remains valid by either checking systemInfoValueTag in SystemInformationBlockType1 after the modification period boundary, or attempting to find the systemInfoModification indication/flag at least modificationPeriodCoeff (which is configured by the network using the radio resource control (RRC) protocol (3GPP TS 36.331 v11.3.0 (2013-03)) times during the modification period in case no paging is received, in every modification period. If no paging message is received by the UE during a modification period, the UE may assume that no change of system information will occur at the next modification period boundary. If a UE in RRC_CONNECTED, during a modification period, receives one paging message, it may deduce from the presence/absence of systemInfoModification whether a change of system information will occur in the next modification period or not.

As discussed above in the Summary section, using the conventional SI update procedures for extended DRX UEs (i.e. UEs with DRX cycles longer than the SFN period/SI modification period), it cannot be assured that these UEs can be made aware of an SI change. This is because an extended DRX UE can be in sleep mode with its receiver turned off during an entire modification period, which means that it is unable to receive paging information about changed SI and to adjust its operation in accordance with the changed system information before the UE's next active period (e.g. data transmission and/or reception).

Thus, according to an aspect, additional paging messages are transmitted to extended DRX UEs 12 by the network before the conventional 'change notification'/'notification period' 60 occurs. This additional paging ensures that extended DRX UEs 12 are also notified of an upcoming SI update.

Figure 6:
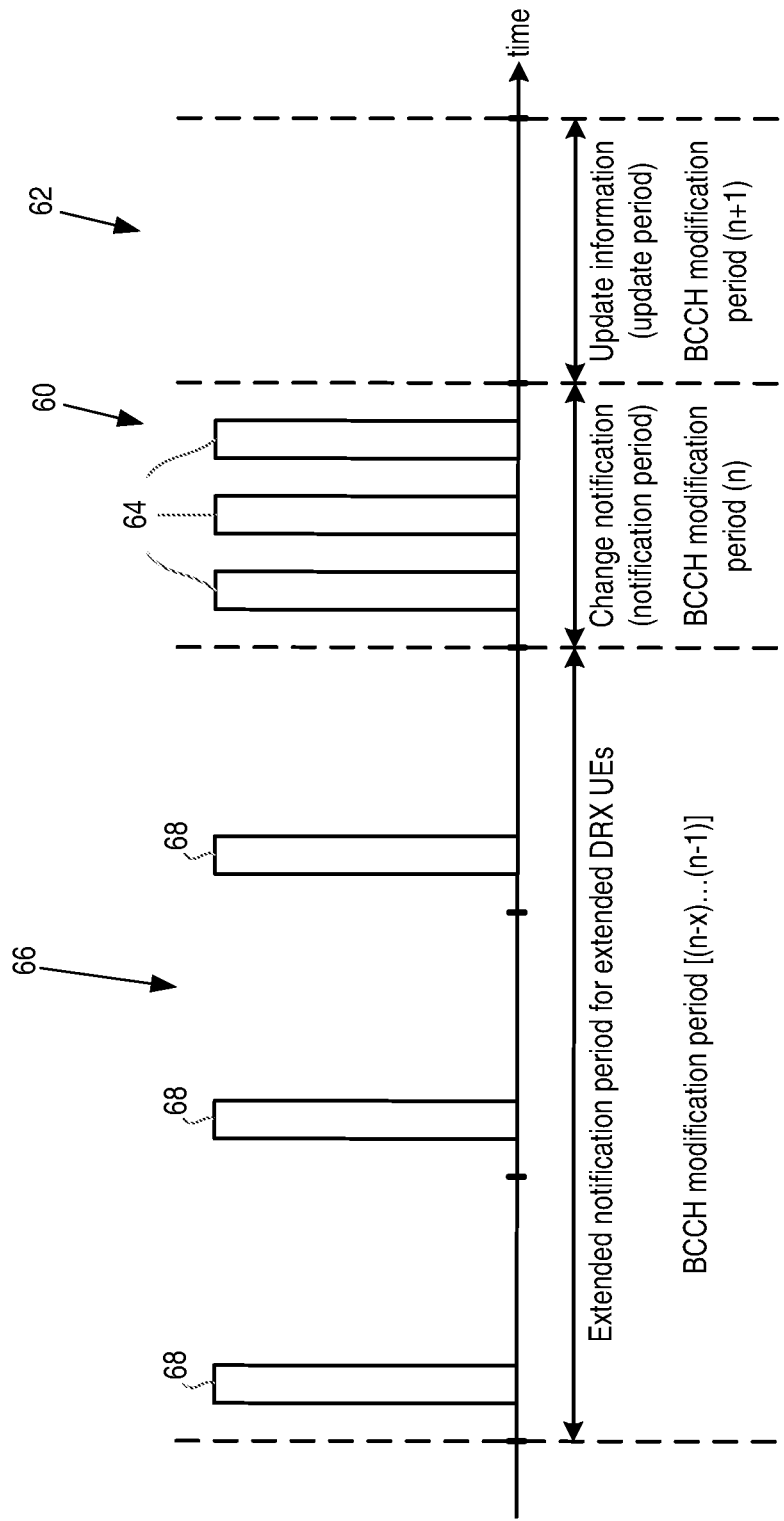
FIG. 6 illustrates the signalling of a change of system information for a mobile device operating with an extended DRX cycle.

FIG. 6 illustrates the signalling of a change of system information for a mobile device 12 operating with an extended DRX cycle according to this aspect. As noted above, system information is updated at the start of an update period 62 (corresponding to modification period (n+1) in FIG. 6). Notification of the update to the system information is communicated to UEs operating conventionally (e.g. operating without DRX or with DRX cycles that are shorter than the modification period) in the preceding modification period—notification period 60 (corresponding to modification period (n) in FIG. 6). In this notification period 60, paging messages 64 are transmitted to the UEs with the systemInfoModification-flag set to show that a system information update will occur at the next modification period boundary.

According to this aspect, before the conventional notification period 60, an additional notification period (which is called an 'extended notification' period 66 herein) is provided in which paging messages 68 are transmitted to UEs 12 operating with an extended DRX cycle (i.e. a DRX cycle that is longer than a modification period). The length of the extended notification period can be set according to the maximum permitted DRX cycle for the UEs 12 and can have a length of one or more modification periods. For example where modification period (n) corresponds to the change notification/notification period 60, the extended notification period 66 can correspond to modification periods (n−x) to (n−1), where x is any positive integer value equal to or greater than 1.

The additional paging messages 68 transmitted to extended-DRX UEs 12 can be in the same format as the paging messages 64 sent to UEs operating without DRX or with DRX cycles that are shorter than the modification period (including so-called 'legacy UEs' that are not able to operate with the extended DRX described herein).

Thus, the paging messages 68 can comprise the systemInfoModification-flag that is set to indicate whether there is an update to SI, as used by legacy UEs. However, the paging messages 68 can also comprise additional information indicating that it is only for use by UEs 12 operating in an extended DRX mode. This additional information can be provided in the form of an additional bit, flag or information element (IE) indicating that the message 68 is for extended-DRX UEs only. Thus, legacy UEs (and UEs operating without DRX or with DRX cycles less than a modification period) are therefore able to disregard this additional paging message 68 and not attempt to update SI either prematurely (for example by assuming that the modification period following the modification period in which the paging message 68 is received is an updated information modification period 62) or attempting to update SI multiple times.

It will be appreciated that sending the additional paging message 68 prior to the 'Change Notification' period 60 allows the network 2 to still have the same 'Update Information' period 62 for the extended-DRX UEs 12. That means that the updated SI will be applied at the same time for extended-DRX UEs 12, legacy UEs, and UEs operating without DRX or with a DRX cycle that is less than a modification period.

Thus, this aspect leaves legacy procedures unaffected by the new paging messages 68 but ensures that paging messages (and specifically messages indicating SI updates) reach extended-DRX UEs 12.

Figure 7:
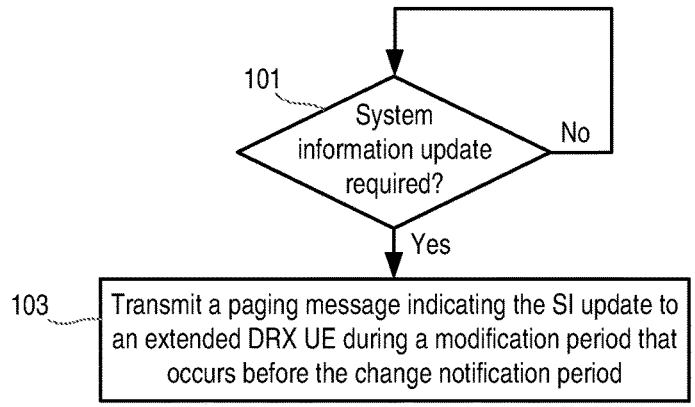
FIG. 7 is a flow chart illustrating a method of operating a network node according to an embodiment.

The flow chart in FIG. 7 illustrates a method of operating a network node, such as a base station (e.g. an eNodeB) according to an embodiment. In step 101, the network node 10 determines if there will be an update to System Information (SI). The node 10 may determine that an update is required through signalling received from the core network 4 or by other means (for example as a result of an algorithm executing in the node 10). This step can also comprise determining when the SI update will be implemented (thus the node 10 determines which modification period is going to be the updated information modification period. The node 10 repeats step 101 until an SI update is required.

If there is a UE 12 in the coverage area of the node 10 that is operating in an extended DRX mode, then if an SI update is required, the node 10 transmits a paging message 68 to the extended DRX UE 12 during the regular paging time for the UE 12 with an indication that an SI update will be occurring (step 103). This indication can comprise a bit, a flag or a systemInfoModification flag. If the regular paging time for the extended DRX UE 12 happens to fall in the change notification modification period 60, then this paging message can be conventional and transmitted to the UE 12 in the change notification modification period 60. However, if the regular paging time for the extended DRX UE 12 does not fall within the change notification modification period 60, then this paging message 68 will be transmitted to the UE 12 in a modification period prior to the change notification modification period 60. The UE 12 will be aware of the length of the extended notification period (for example from information provided as part of the paging message—e.g. the next system information update will happen at SFN=x, where x≤SFN range(max)) and thus can determine when it needs to obtain the new SI. Otherwise, the UE 12 can check the value tag in SIB1 if it is unsure and obtain new system information when the value tag has changed.

In an alternative implementation of step 103, instead of transmitting the paging message 68 to the extended DRX UE 12 during the regular paging time for the UE 12 with the indication that the SI update will be occurring, the node 10 can transmit the paging message to an extended DRX UE 12 according to a predefined schedule (i.e. that may not coincide with the regular paging time for the UE 12). In some embodiments, the exact timing of the paging messages 68 in the predefined schedule and the periods between the paging message 68 could depend on the longest possible DRX or paging cycle that is available with the node 10. In this way, all UEs 12 having an extended DRX cycle will have the opportunity to listen to at least one paging occasion. Thus, in some embodiments, the node 10 determines the timing for the paging message 68 for each UE 12 from the longest used (or longest possible) DRX cycle and the particular DRX cycle length used by each UE 12. The UEs 12 can also determine their paging occasions from the used or (longest possible) DRX cycle. As an alternative approach, the node 10 can determine the length of the extended notification period from the longest used DRX cycle length and the specific paging timing is then based on the DRX/paging cycles of the UEs 12. It will be noted that it does not matter that the UEs 12 do not know each others DRX cycle lengths, as the node 10 will time the paging messages for particular UEs 12 based on the DRX cycle length used by each UE 12. This may mean that the UEs 12 using the longest DRX cycles may get notified of the SI change the earliest. In some other embodiments, the signalling of the timing of the paging messages 68 relating to SI change may be indicated in the broadcast system information, or in some form of system information that is directed only towards the affected UEs 12 (i.e. dedicated system information). In other embodiments, the timing of the paging messages 68 could be static and, for example, defined in a standard (e.g. a 3GPP standard).

Figure 8:
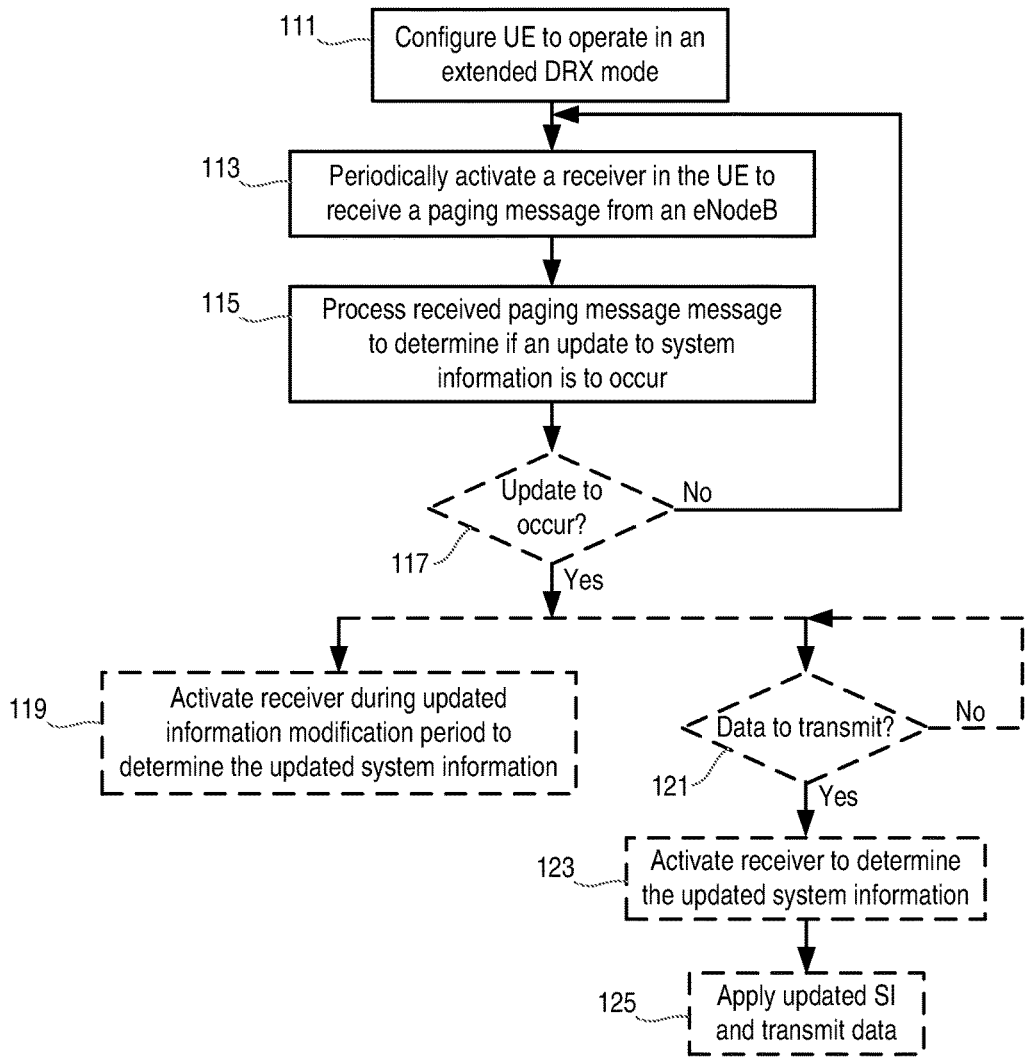
FIG. 8 is a flow chart illustrating a method of operating a mobile device according to an embodiment.

The flow chart in FIG. 8 illustrates a method of operating a mobile device (UE) according to an embodiment. In a first step, step 111, the UE 12 configures itself to operate in an extended DRX mode. That is, the processing module 30 deactivates the receiver or transceiver module 32 to reduce the power consumption of the UE 12. The processing module 30 then periodically activates the receiver or transceiver module 32 to receive paging messages from the network 2 (and in particular from a serving base station 10 for the UE 12)—step 113. It will be appreciated that 'activating' and 'deactivating' the receiver or transceiver module 32 can mean respectively supplying and removing power from some or all components of the receiver or transceiver module 32.

When the UE 12 receives a paging message 68, the processing module 30 processes the message 68 to determine if an update to System Information is to occur (step 115). This processing can comprise examining whether a bit or flag is set in a systemInfoModification field.

As the UE 12 is operating in an extended DRX mode, a paging message 68 indicating an SI update may be received by the UE 12 in a modification period that occurs prior to the normal change notification modification period 60 (that itself occurs immediately before the updated information modification period 62). The particular modification period in which the paging message 68 is received (relative to the modification period in which the SI update is applied) depends on the paging cycle of the UE 12.

Optionally, after step 115, the method can comprise further steps. If it is determined in step 115 that no SI update is to occur, the method can return to step 113 and repeat for the next paging message 68. If it is determined that an update to SI is to occur, then the method can comprise the processing module 30 controlling the receiver or transceiver module 32 to activate during the updated information modification period 62 to determine the updated System Information (step 119).

Alternatively, as the SI (and subsequently the updated SI) is regularly broadcast by the network node 10 (as shown in FIG. 5) the processing module 30 can control the receiver or transceiver module 32 to activate during a modification period occurring after the updated information modification period 62 and determine the updated System Information from the SI broadcast in that modification period.

In another alternative embodiment, an extended-DRX UE 12 can note that an update to SI will occur following step 115 (for example by setting and storing an internal flag) and wait to read and apply the new SI until the next time that the UE 12 is to transmit or receive data. This alternative is also illustrated in FIG. 8. Thus, following step 117, the processing module 30 determines if the UE 12 has data to transmit or receive (step 121). If not, the UE 12 waits until there is data to transmit or receive. Then, prior to the data transmission or reception, the processing module 30 activates the receiver or transceiver module 32 to read the updated SI (step 123). The UE 12 then applies the updated SI and transmits/receives the data (step 125). This embodiment means that the UE 12 will only use resource (i.e. battery power) on reading SI and applying the updated SI when it is actually needed, i.e., when transmitting or receiving data, thus avoiding the reading of updated SI multiple times during long periods of inactivity by the UE 12.

In alternative implementations to those described above, for example when the changes to the System Information concern less crucial parameters of the network 2 meaning that the UE 12 does not need to apply the updated SI in order to continue to successfully receive paging messages (i.e. there are no bandwidth changes, etc.), the paging message informing the mobile device about the SI update can be transmitted to the UE 12 during a modification period that occurs after the updated information modification period 62. This paging message 68 can be provided in the form described above, and can be configured to be ignored by legacy UEs as before.

Thus, in accordance with the aspects described above, UEs with DRX cycle lengths longer than the SI modification period can avoid having to unnecessarily read SI (e.g. SIB1) prior to many data transmissions. Although the network will have to send additional paging messages when an SI update occurs compared to the normal procedure, SI change is rare in practice and the paging message load could very well be equally high if these UEs had normal DRX cycles within the modification period since then the paging occasions would have to be distributed using an offset.

For the MTC/extended-DRX UEs, on the other hand, every frame they can remain in sleep mode will have large impact on the UE's battery life. The embodiments provided have the advantage that the paging message will be read during the normal DRX on-duration and does not require any prolonged wake-up time. Further, avoiding having to read the SI (e.g. SIB1) prior to every data transmission will prolong the UE's battery life significantly.

Furthermore, relying on always having to read SIB1 is limited by the wraparound nature of the Value Tag contained in that SIB. The Value Tag has 32 values and therefore the maximal DRX cycle length would, in theory, be limited to 32*(SFN wraparound)=5 minutes and 30 seconds. With the above embodiments, there is no such upper limit on the DRX cycle length.

A further advantage is that there is no need to extend and/or alter the modification period and the operation of legacy UEs will not be affected.

Figure 9:
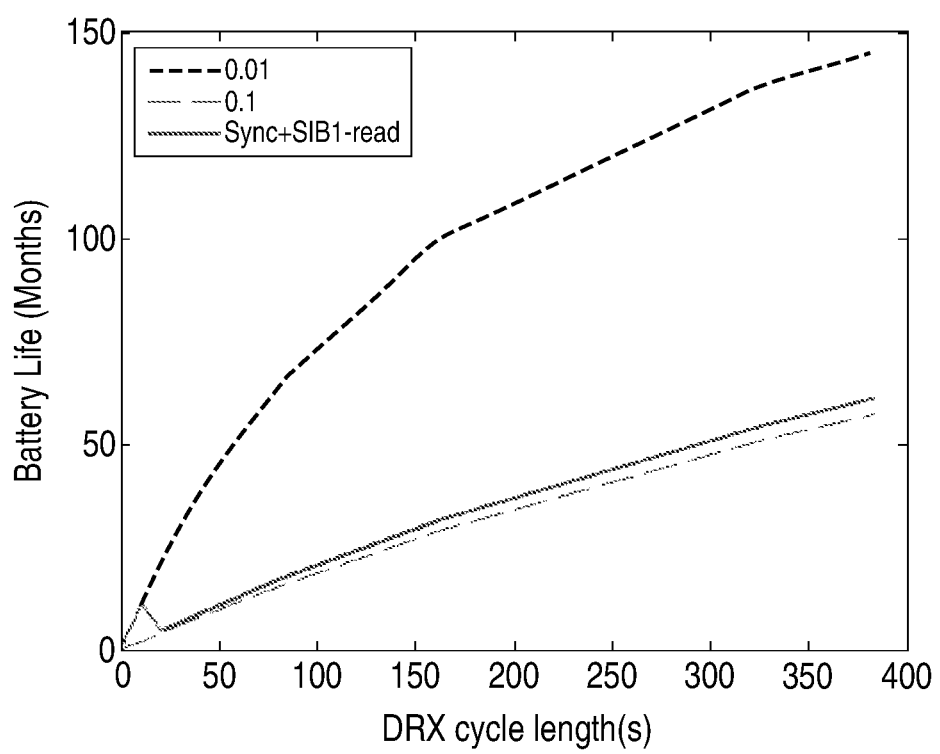
FIG. 9 is a graph illustrating the potential improvements in battery life provided by the embodiments described herein.

The graph in FIG. 9 illustrates the potential battery life gains that the above aspects can provide. The battery life of an extended DRX UE is plotted as a function of the DRX cycle length. RRC connected mode is modelled with a rather power efficient sleep mode (MTC forecast) and the traffic modelled is 1 kB packets in uplink with an inter-arrival time of 3 hours. The solid curve displays the UE battery life according to conventional DRX operation; which shows that battery life increases significantly with increasing DRX cycle length up until the point where it is equal to the modification period (10.24 seconds in this case). The dashed curves show the battery life for two fixed start-up times before the transmission, 10 ms for the shorter-dashed curve and 100 ms for the longer-dashed curve. For longer DRX cycle lengths than the modification period, the UE would require both time to synchronize (10 ms modelled here) and additional time to read to SI (80 ms to read SIB1 modelled here as a worst case scenario). Therefore the battery life without extended DRX operation described herein (the solid line) is close to that of a fixed long delay of 100 ms. With the extended DRX operation described herein, the additional time to read system information could be avoided and battery life according to the shorter-dashed curve could be achieved. For a DRX cycle length of 163 seconds that would correspond to an increase in battery life from 2.6 years to 8.4 years, which is a gain of 218%.

The aspects and embodiments described thus provide ways in which the signalling of updates to system information can be sent to mobile devices operating with an extended discontinuous reception (DRX) period.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various exemplary embodiments of the invention are set out in the following statements:

1. A method of operating a network node in a communication network, the communication network comprising at least one mobile device that is operating in a discontinuous reception, DRX, mode with a DRX cycle length that is longer than a modification period in the network, the method comprising when an update to system information is to occur in an updated information modification period, the modification period immediately preceding the updated information modification period comprising a change notification modification period, transmitting a paging message to the mobile device during a modification period other than the change notification modification period and the updated information modification period, the paging message informing the mobile device that an update to system information is to occur in the updated information modification period.

2. The method of statement 1, wherein the step of transmitting the paging message comprises transmitting the paging message informing the mobile device about the update to system information to the mobile device during a modification period that occurs before the change notification modification period.

3. The method of statement 1, wherein the step of transmitting the paging message comprises transmitting the paging message informing the mobile device about the update to system information to the mobile device during a modification period that occurs after the updated information modification period.

4. The method of statement 1, 2 or 3, wherein the paging message includes a flag indicating that an update to system information is to occur.

5. The method of statement 4, wherein the flag is a systemInfoModification-flag.

6. The method of any preceding statement, wherein the step of transmitting the paging message comprises transmitting the paging message with additional information indicating that it is only for use by mobile devices operating in a DRX mode with a DRX cycle length that is longer than a modification period.

7. The method of any preceding statement, the method further comprising, prior to the step of transmitting the paging message, the step of determining if an update to system information is to occur.

8. The method of any preceding statement, wherein the step of transmitting the paging message is performed during a regular paging time in the DRX cycle for the mobile device.

9. The method of any of statements 1-7, wherein the modification period the paging message is transmitted to the mobile device in is determined according to a predefined schedule or to a DRX cycle length in use in a cell managed by the network node or configured by broadcast or dedicated system information.

10. The method of any preceding statement, wherein the method further comprises the step of when an update to system information is to occur in the updated information modification period, transmitting a paging message during the change notification modification period to one or more mobile devices that are not operating in a DRX mode with a DRX cycle length that is longer than a modification period, the paging message informing the one or more mobile devices that an update to system information is to occur in the updated information modification period.

11. A computer program product having computer readable code embodied therein, the computer readable code being configured such that, on execution by a suitable computer or processor, the computer or processor is caused to perform the method of any of statements 1-10.

12. A network node for use in a communication network that comprises at least one mobile device that is operating in a discontinuous reception, DRX, mode with a DRX cycle length that is longer than a modification period in the network, the network node being adapted to transmit a paging message to the mobile device during a modification period other than a change notification modification period and an updated information modification period when an update to system information is to occur in the updated information modification period, the change notification modification period being the modification period immediately preceding the updated information modification period, the paging message informing the mobile device that an update to system information is to occur in the updated information modification period.

13. The network node of statement 12, wherein the network node is adapted to transmit the paging message informing the mobile device about the update to system information to the mobile device during a modification period that occurs before the change notification modification period.

14. The network node of statement 12, wherein the network node is adapted to transmit the paging message informing the mobile device about the update to system information to the mobile device during a modification period that occurs after the updated information modification period.

15. The network node of statement 12, 13 or 14, wherein the network node is adapted to include a flag indicating that an update to system information is to occur in the paging message.

16. The network node of statement 15, wherein the flag is a systemInfoModification-flag.

17. The network node of any of statements 12-16, wherein the network node is adapted to transmit the paging message with additional information indicating that it is only for use by mobile devices operating in a DRX mode with a DRX cycle length that is longer than a modification period.

18. The network node of any of statements 12-17, wherein the network node is adapted to determine if an update to system information is to occur prior to transmitting the paging message.

19. The network node of any of statements 12-18, wherein the network node is adapted to transmit the paging message during a regular paging time in the DRX cycle for the mobile device.

20. The network node of any of statements 12-18, wherein the network node is adapted to transmit the paging message to the mobile device in a modification period determined according to a predefined schedule or to a DRX cycle length in use in a cell managed by the network node or configured by broadcast or dedicated system information.

21. The network node of any of statements 12-20, wherein the network node is further adapted such that, when an update to system information is to occur in the updated information modification period, the network node transmits a paging message during the change notification modification period to one or more mobile devices that are not operating in a DRX mode with a DRX cycle length that is longer than a modification period, the paging message informing the one or more mobile devices not operating in a DRX mode with a DRX cycle length that is longer than a modification period that an update to system information is to occur in the updated information modification period.

22. The network node of any of statements 12-21, wherein the network node is a base station.

23. A method of operating a mobile device in a communication network, the communication network comprising a network node, the method comprising operating the mobile device in a discontinuous reception, DRX, mode with a DRX cycle length that is longer than a modification period in the network; periodically activating a receiver in the mobile device to receive a paging message from the network node; processing a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

24. The method of statement 23, wherein the paging message indicating an update to system information is received during a modification period that occurs before the change notification modification period.

25. The method of statement 23, wherein the paging message indicating an update to system information is received during a modification period that occurs after the updated information modification period.

26. The method of any of statements 23, 24 or 25, wherein the method further comprises the step of activating the receiver in the mobile device during the updated information modification period to determine the updated system information if the paging message indicates an update to system information is to occur.

27. The method of any of statements 23, 24 or 25, wherein the method further comprises the step of, following receipt of a paging message indicating that an update to system information is to occur, activating the receiver in the mobile device to determine the updated system information when the mobile device is to transmit data to the network node.

28. The method of any of statements 23-27, wherein the paging message includes a flag indicating whether an update to system information is to occur, and the step of processing a received paging message to determine if an update to system information is to occur comprises examining whether the flag is set.

29. The method of statement 28, wherein the flag is a system InfoModification-flag.

30. The method of any of statements 23-29, wherein the paging message comprises additional information indicating that it is only for use by mobile devices operating in a DRX mode with a DRX cycle length that is longer than a modification period.

31. The method of any of statements 23-30, wherein the step of periodically activating a receiver in the mobile device to receive a paging message from the network node comprises periodically activating the receiver according to the DRX cycle for the mobile device such that the paging message is received during a regular paging time in the DRX cycle.

32. The method of any of statements 23-30, wherein the step of periodically activating a receiver in the mobile device to receive a paging message from the network node comprises activating the receiver according to a predefined schedule or to a DRX cycle length in use in a cell managed by the network node or according to broadcast or dedicated system information.

33. A computer program product having computer readable code embodied therein, the computer readable code being configured such that, on execution by a suitable computer or processor, the computer or processor is caused to perform the method of any of statements 23-32.

34. A mobile device for use in a communication network that comprises a network node, the mobile device comprising a receiver, and the mobile device being adapted to operate in a discontinuous reception, DRX, mode with a DRX cycle length that is longer than a modification period in the network; periodically activate the receiver to receive a paging message from the network node; and process a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

35. The mobile device of statement 34, wherein the paging message indicating an update to system information is received during a modification period that occurs before the change notification modification period.

36. The mobile device of statement 34, wherein the paging message indicating an update to system information is received during a modification period that occurs after the updated information modification period.

37. The mobile device of any of statements 34, 35 or 36 wherein the mobile device is adapted to activate the receiver to receive a paging message during the updated information modification period in order to determine the updated system information if the paging message indicates an update to system information is to occur.

38. The mobile device of any of statements 34, 35 or 36, wherein the mobile device is adapted to activate the receiver to receive the paging message to determine the updated system information when the mobile device is to transmit data to the network if the paging message indicates an update to system information is to occur.

39. The mobile device of any of statements 34-38, wherein the paging message includes a flag indicating whether an update to system information is to occur, and the mobile device is adapted to examine whether the flag is set to determine if an update to system information is to occur.

40. The mobile device of statement 39, wherein the flag is a system InfoModification-flag.

41. The mobile device of any of statements 34-40, wherein the paging message comprises additional information indicating that it is only for use by mobile devices operating in a DRX mode with a DRX cycle length that is longer than a modification period.

42. The mobile device of any of statements 34-41, wherein the mobile device is adapted to periodically activate the receiver to receive a paging message according to the DRX cycle for the mobile device, such that the paging message is received during a regular paging time in the DRX cycle.

43. The mobile device of any of statements 34-41, wherein the mobile device is adapted to periodically activate the receiver receive a paging message from the network node according to a predefined schedule or to a DRX cycle length in use in a cell managed by the network node or according to broadcast or dedicated system information.

44. A network node for use in a communication network that comprises at least one mobile device that is operating in a discontinuous reception, DRX, mode with a DRX cycle length that is longer than a modification period in the network, the network node comprising a processor and a memory, said memory containing instructions executable by said processor whereby said network node is operative to transmit a paging message to the mobile device during a modification period other than a change notification modification period and an updated information modification period when an update to system information is to occur in the updated information modification period, the change notification modification period being the modification period immediately preceding the updated information modification period, the paging message informing the mobile device that an update to system information is to occur in the updated information modification period.

45. The network node of statement 44, wherein said network node is operative to transmit the paging message informing the mobile device about the update to system information to the mobile device during a modification period that occurs before the change notification modification period.

46. The network node of statement 44, wherein said network node is operative to transmit the paging message informing the mobile device about the update to system information to the mobile device during a modification period that occurs after the updated information modification period.

47. The network node of statement 44, 45 or 46, wherein said network node is operative to include a flag indicating that an update to system information is to occur in the paging message.

48. The network node of statement 47, wherein the flag is a systemInfoModification-flag.

49. The network node of any of statements 44-48, wherein said network node is operative to transmit the paging message with additional information indicating that it is only for use by mobile devices operating in a DRX mode with a DRX cycle length that is longer than a modification period.

50. The network node of any of statements 44-49, wherein said network node is operative to determine if an update to system information is to occur prior to transmitting the paging message.

51. The network node of any of statements 44-50, wherein said network node is operative to transmit the paging message during a regular paging time in the DRX cycle for the mobile device.

52. The network node of any of statements 44-50, wherein said network node is operative to transmit the paging message to the mobile device in a modification period determined according to a predefined schedule or to a DRX cycle length in use in a cell managed by the network node or configured by broadcast or dedicated system information.

53. The network node of any of statements 44-52, wherein said network node is further operative such that, when an update to system information is to occur in the updated information modification period, the network node transmits a paging message during the change notification modification period to one or more mobile devices that are not operating in a DRX mode with a DRX cycle length that is longer than a modification period, the paging message informing the one or more mobile devices not operating in a DRX mode with a DRX cycle length that is longer than a modification period that an update to system information is to occur in the updated information modification period.

54. The network node of any of statements 44-53, wherein the network node is a base station.

55. A mobile device for use in a communication network that comprises a network node, the mobile device comprising a receiver, a processor and a memory, said memory containing instructions executable by said processor whereby said mobile device is operative to operate in a discontinuous reception, DRX, mode with a DRX cycle length that is longer than a modification period in the network; periodically activate the receiver to receive a paging message from the network node; and process a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

56. The mobile device of statement 55, wherein the paging message indicating an update to system information is received during a modification period that occurs before the change notification modification period.

57. The mobile device of statement 55, wherein the paging message indicating an update to system information is received during a modification period that occurs after the updated information modification period.

58. The mobile device of any of statements 55, 56 or 57 wherein said mobile device is operative to receive a paging message during the updated information modification period in order to determine the updated system information if the paging message indicates an update to system information is to occur.

59. The mobile device of any of statements 55, 56 or 57, wherein said mobile device is operative to receive the paging message to determine the updated system information when the mobile device is to transmit data to the network if the paging message indicates an update to system information is to occur.

60. The mobile device of any of statements 55-59, wherein the paging message includes a flag indicating whether an update to system information is to occur, and said mobile device is operative to examine whether the flag is set to determine if an update to system information is to occur.

61. The mobile device of statement 60, wherein the flag is a system InfoModification-flag.

62. The mobile device of any of statements 55-61, wherein the paging message comprises additional information indicating that it is only for use by mobile devices operating in a DRX mode with a DRX cycle length that is longer than a modification period.

63. The mobile device of any of statements 55-62, wherein said mobile device is operative to periodically activate the receiver to receive a paging message according to the DRX cycle for the mobile device, such that the paging message is received during a regular paging time in the DRX cycle.

64. The mobile device of any of statements 55-62, wherein said mobile device is operative to periodically activate the receiver to receive a paging message from the network node according to a predefined schedule or to a DRX cycle length in use in a cell managed by the network node or according to broadcast or dedicated system information.

65. A network node for use in a communication network that comprises at least one mobile device that is operating in a discontinuous reception, DRX, mode with a DRX cycle length that is longer than a modification period in the network, the network node comprising transmitting means for transmitting a paging message to the mobile device during a modification period other than a change notification modification period and an updated information modification period when an update to system information is to occur in the updated information modification period, the change notification modification period being the modification period immediately preceding the updated information modification period, the paging message informing the mobile device that an update to system information is to occur in the updated information modification period.

66. The network node of statement 65, wherein the transmitting means is for transmitting the paging message informing the mobile device about the update to system information to the mobile device during a modification period that occurs before the change notification modification period.

67. The network node of statement 65, wherein the transmitting means is for transmitting the paging message informing the mobile device about the update to system information to the mobile device during a modification period that occurs after the updated information modification period.

68. The network node of statement 65, 66 or 67, wherein the transmitting means is further including a flag indicating that an update to system information is to occur in the paging message.

69. The network node of statement 68, wherein the flag is a systemInfoModification-flag.

70. The network node of any of statements 65-69, wherein the transmitting means is for transmitting the paging message with additional information indicating that it is only for use by mobile devices operating in a DRX mode with a DRX cycle length that is longer than a modification period.

71. The network node of any of statements 65-70, wherein the network node further comprises processing means for determining if an update to system information is to occur prior to transmitting the paging message.

72. The network node of any of statements 65-71, wherein the transmitting means is for transmitting the paging message during a regular paging time in the DRX cycle for the mobile device.

73. The network node of any of statements 65-71, wherein the transmitting means is for transmitting the paging message to the mobile device in a modification period determined according to a predefined schedule or to a DRX cycle length in use in a cell managed by the network node or configured by broadcast or dedicated system information.

74. The network node of any of statements 65-73, wherein, when an update to system information is to occur in the updated information modification period, the transmitting means is further for transmitting a paging message during the change notification modification period to one or more mobile devices that are not operating in a DRX mode with a DRX cycle length that is longer than a modification period, the paging message informing the one or more mobile devices not operating in a DRX mode with a DRX cycle length that is longer than a modification period that an update to system information is to occur in the updated information modification period.

75. The network node of any of statements 65-74, wherein the network node is a base station.

76. A mobile device for use in a communication network that comprises a network node, the mobile device comprising receiver control means for operating a receiver in the mobile device in a discontinuous reception, DRX, mode with a DRX cycle length that is longer than a modification period in the network, and for periodically activating the receiver to receive a paging message from the network node; and processing means for processing a received paging message to determine if an update to system information is to occur in an updated information modification period, the updated information modification period being preceded by a change notification modification period, wherein a paging message indicating an update to system information is to occur is received during a modification period other than the change notification modification period and the updated information modification period.

77. The mobile device of statement 76, wherein the paging message indicating an update to system information is received during a modification period that occurs before the change notification modification period.

78. The mobile device of statement 76, wherein the paging message indicating an update to system information is received during a modification period that occurs after the updated information modification period.

79. The mobile device of any of statements 76, 77 or 78 wherein the receiver control means is for operating the receiver to receive a paging message during the updated information modification period in order to determine the updated system information if the paging message indicates an update to system information is to occur.

80. The mobile device of any of statements 76, 77 or 78, wherein the receiver control means is for operating the receiver to receive a paging message to determine the updated system information when the mobile device is to transmit data to the network if the paging message indicates an update to system information is to occur.

81. The mobile device of any of statements 76-80, wherein the paging message includes a flag indicating whether an update to system information is to occur, and the processing means is for examining whether the flag is set to determine if an update to system information is to occur.

82. The mobile device of statement 81, wherein the flag is a system InfoModification-flag.

83. The mobile device of any of statements 76-82, wherein the paging message comprises additional information indicating that it is only for use by mobile devices operating in a DRX mode with a DRX cycle length that is longer than a modification period.

84. The mobile device of any of statements 76-83, wherein the receiver control means is for periodically activating the receiver to receive a paging message according to the DRX cycle for the mobile device, such that the paging message is received during a regular paging time in the DRX cycle.

85. The mobile device of any of statements 76-83, wherein the receiver control means is for periodically activating the receiver to receive a paging message from the network node according to a predefined schedule or to a DRX cycle length in use in a cell managed by the network node or according to broadcast or dedicated system information.

The "transmitting means" and "processing means" of the network node, as well as the "receiver control means" and "processing means" of the mobile device may in some embodiments be implemented as computer programs stored in memory (e.g. in the memory modules in FIGS. 2 and 3 respectively) for execution by processors (e.g. the processing modules of FIGS. 2 and 3 respectively).

The invention claimed is:

1. A method of operating a mobile device in a communication network, the communication network comprising a network node, the method comprising:
operating the mobile device in a discontinuous reception, DRX, mode with a DRX cycle length that is longer than a modification period in the network;
periodically activating a receiver in the mobile device to receive a paging message from the network node;
processing a received paging message to determine if an update to system information is to occur in an updated information modification period, the updated information modification period being preceded by a change notification modification period, wherein a paging message is received during a modification period, that modification period occurs before the change notification modification period, and the paging message indicates an update to system information is to occur,
wherein the method further comprises:
the step of activating the receiver in the mobile device during the updated information modification period to determine the updated system information responsive to the paging message indicating an update to system information is to occur; or
the step of, following receipt of a paging message indicating that an update to system information is to occur, activating the receiver in the mobile device to determine the updated system information when the mobile device is to transmit data to the network node.

2. The method of claim 1, wherein the paging message includes a flag indicating whether an update to system information is to occur, and the step of processing a received paging message to determine if an update to system information is to occur comprises examining whether the flag is set.

3. The method of claim 2, wherein the flag is a systemInfoModification-flag.

4. The method of claim 1, wherein the paging message comprises additional information indicating that it is only for use by mobile devices operating in a DRX mode with a DRX cycle length that is longer than a modification period.

5. The method of claim 1, wherein the step of periodically activating a receiver in the mobile device to receive a paging message from the network node comprises periodically activating the receiver according to the DRX cycle for the mobile device such that the paging message is received during a regular paging time in the DRX cycle.

6. The method of claim 1, wherein the step of periodically activating a receiver in the mobile device to receive a paging message from the network node comprises activating the receiver according to a predefined schedule or to a DRX cycle length in use in a cell managed by the network node or according to broadcast or dedicated system information.

7. A mobile device for use in a communication network that comprises a network node, the mobile device comprising a receiver, and the mobile device being adapted to:
operate in a discontinuous reception, DRX, mode with a DRX cycle length that is longer than a modification period in the network;
periodically activate the receiver to receive a paging message from the network node; and
process a received paging message to determine if an update to system information is to occur in an updated information modification period, the updated information modification period being preceded by a change notification modification period, wherein a paging message is to occur is received during a modification period, that modification period occurs before the change notification modification period, and the paging message indicates an update to system information is to occur,
wherein the mobile device is adapted to:
activate the receiver during the updated information modification period in order to determine the updated system information responsive to the paging message indicating an update to system information is to occur; or
activate the receiver to determine the updated system information when the mobile device is to transmit data to the network if the paging message indicates an update to system information is to occur.

8. The mobile device of claim 7, wherein the paging message includes a flag indicating whether an update to system information is to occur, and the mobile device is adapted to examine whether the flag is set to determine if an update to system information is to occur.

9. The mobile device of claim 8, wherein the flag is a systemInfoModification-flag.

10. The mobile device of claim 7, wherein the paging message comprises additional information indicating that it is only for use by mobile devices operating in a DRX mode with a DRX cycle length that is longer than a modification period.

11. The mobile device of claim 7, wherein the mobile device is adapted to periodically activate the receiver to receive a paging message according to the DRX cycle for the mobile device, such that the paging message is received during a regular paging time in the DRX cycle.

12. The mobile device of claim 7, wherein the mobile device is adapted to periodically activate the receiver receive a paging message from the network node according to a predefined schedule or to a DRX cycle length in use in a cell managed by the network node or according to broadcast or dedicated system information.

13. A mobile device for use in a communication network that comprises a network node, the mobile device comprising a receiver, a processor and a memory, said memory containing instructions executable by said processor whereby said mobile device is operative to:
operate in a discontinuous reception, DRX, mode with a DRX cycle length that is longer than a modification period in the network;
periodically activate the receiver to receive a paging message from the network node; and
process a received paging message to determine if an update to system information is to occur in an updated information modification period, the updated information modification period being preceded by a change notification modification period, wherein a paging message is received during a modification period, that modification period occurs before the change notification modification period, and the paging message indicates an update to system information is to occur, wherein said mobile device is operative to:

activate the receiver during the updated information modification period in order to determine the updated system information responsive to the paging message indicating an update to system information is to occur; or activate the receiver to determine the updated system information when the mobile device is to transmit data to the network if the paging message indicates an update to system information is to occur.

14. The mobile device of claim 13, wherein the paging message includes a flag indicating whether an update to system information is to occur, and said mobile device is operative to examine whether the flag is set to determine if an update to system information is to occur.

15. The mobile device of claim 14, wherein the flag is a systemInfoModification-flag.

16. The mobile device of claim 13, wherein the paging message comprises additional information indicating that it is only for use by mobile devices operating in a DRX mode with a DRX cycle length that is longer than a modification period.

17. The mobile device of claim 13, wherein said mobile device is operative to periodically activate the receiver to receive a paging message according to the DRX cycle for the mobile device, such that the paging message is received during a regular paging time in the DRX cycle.

18. The mobile device of claim 13, wherein said mobile device is operative to periodically activate the receiver to receive a paging message from the network node according to a predefined schedule or to a DRX cycle length in use in a cell managed by the network node or according to broadcast or dedicated system information.

* * * * *